C. C. LAMB.
TIMING DEVICE FOR EGG BOILERS.
APPLICATION FILED APR. 5, 1913.
1,096,250.
Patented May 12, 1914.
3 SHEETS—SHEET 1.
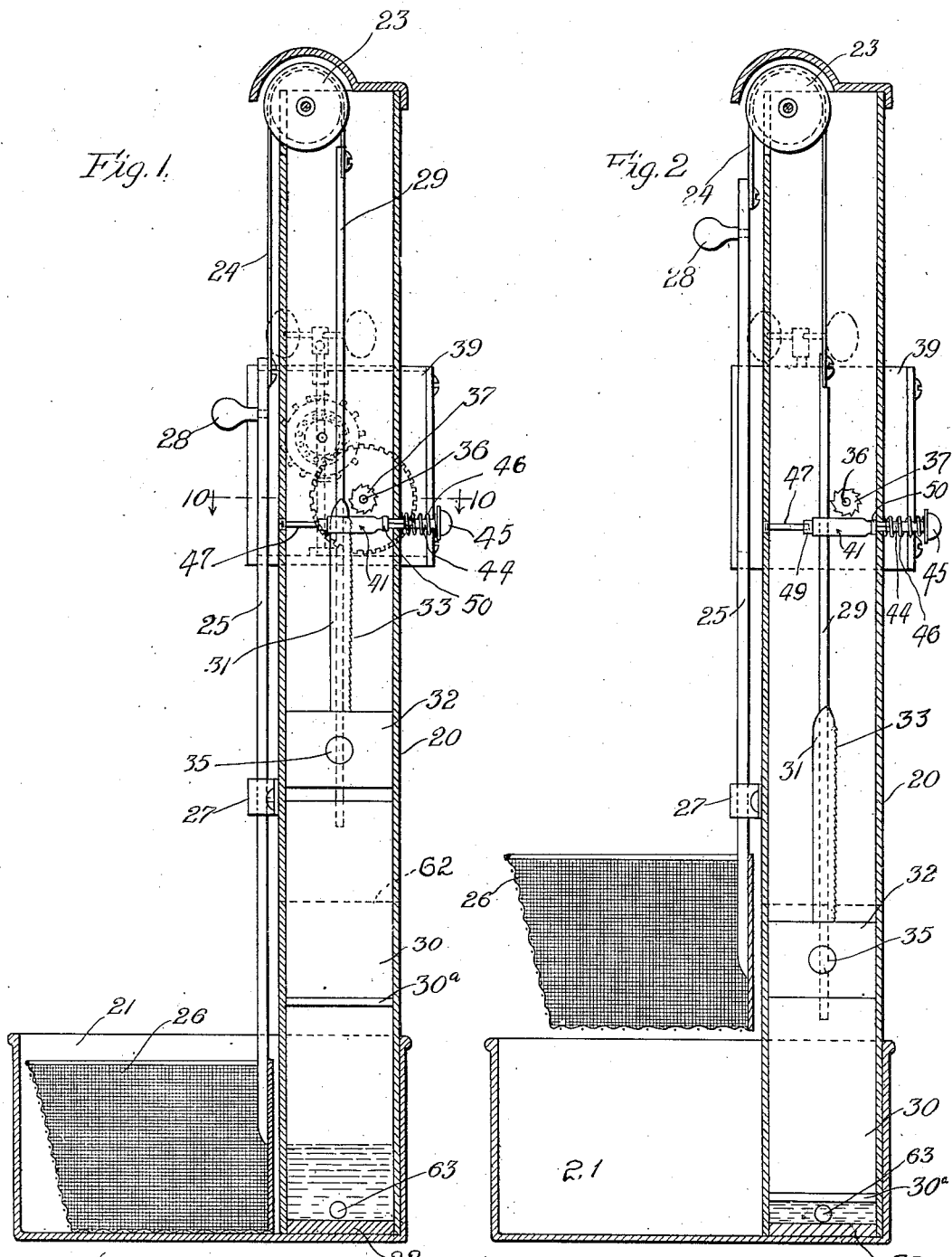
Witnesses:
Inventor:
Charles Calvert Lamb
by Poole & Crouser
Attys

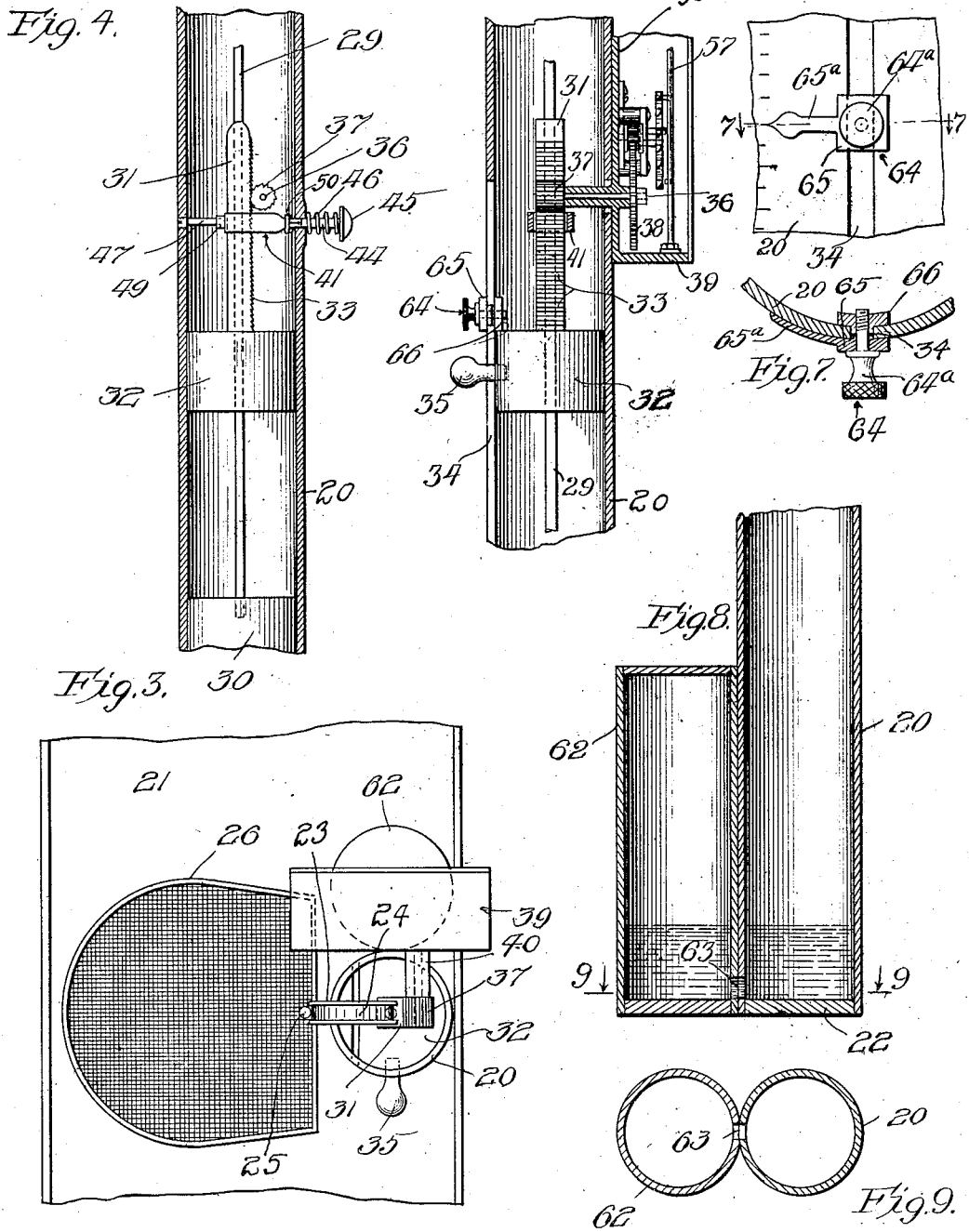

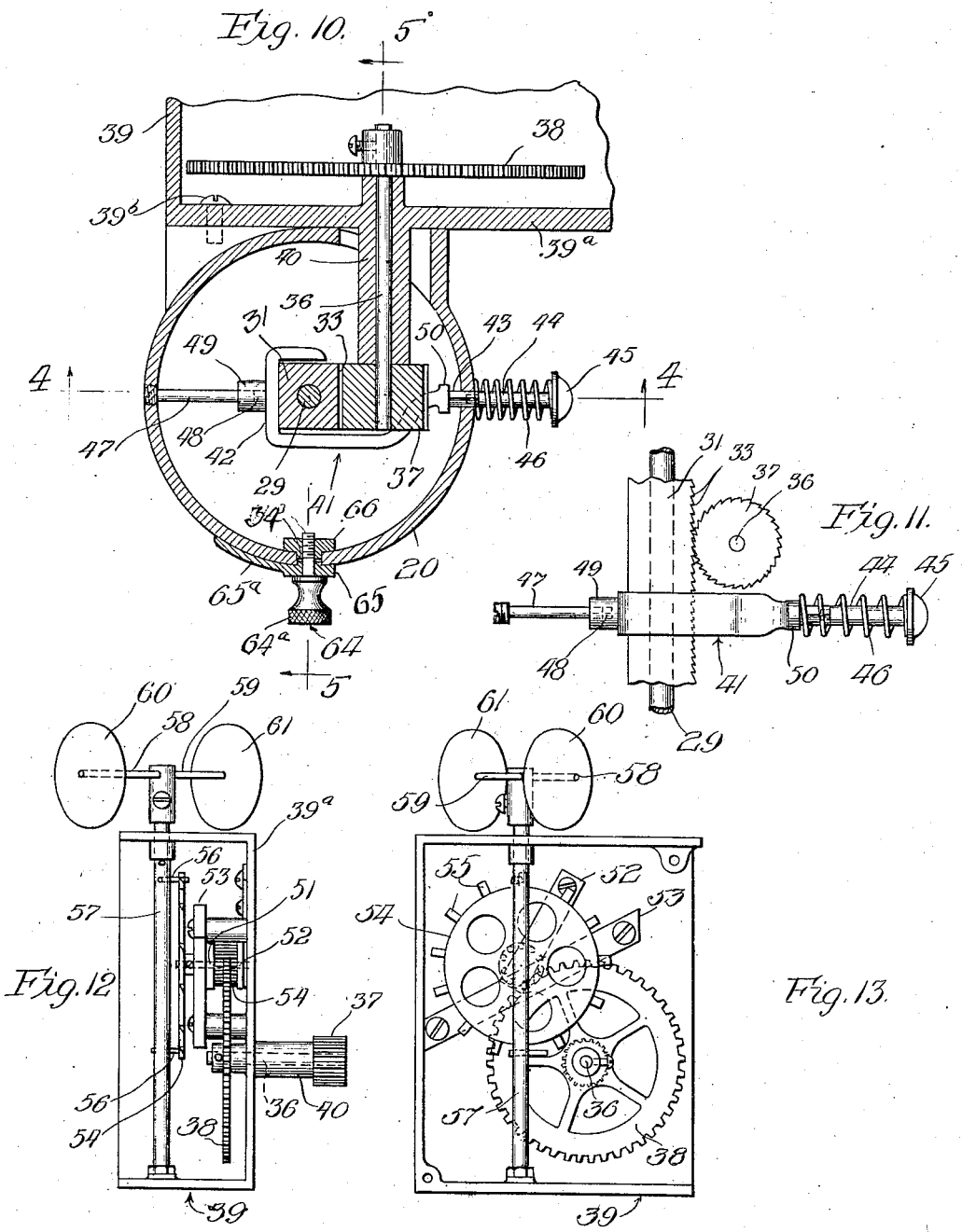
C. C. LAMB.
TIMING DEVICE FOR EGG BOILERS.
APPLICATION FILED APR. 5, 1913.
1,096,250.
Patented May 12, 1914.
3 SHEETS—SHEET 3.
Witnesses:
Harry S. Gaither
Eugene C. Vaun
Inventor,
Charles Calvert Lamb
by Poole & Cruser
Att'ys

UNITED STATES PATENT OFFICE.

CHARLES CALVERT LAMB, OF CHICAGO, ILLINOIS.

TIMING DEVICE FOR EGG-BOILERS.

1,096,250.  Specification of Letters Patent.  Patented May 12, 1914.

Application filed April 5, 1913. Serial No. 758,993.

*To all whom it may concern:*

Be it known that I, CHARLES CALVERT LAMB, a citizen of the United States, and a resident of Chicago, in the county of Cook and State of Illinois, have invented certain new and useful Improvements in Timing Devices for Egg-Boilers; and I do hereby declare that the following is a full, clear, and exact description thereof, reference being had to the accompanying drawings, and to the letters of reference marked thereon, which form a part of this specification.

This invention relates to a timing device for egg boilers and the like.

Among the objects of the invention are to provide a timing device which is not only simple and inexpensive in construction, but is reliable in its operation and will effect the prompt withdrawal of the egg-holding receptacle and its contents from the water in the boiler when the time required for cooking the eggs has expired.

A further object of the invention is to provide means for retarding or checking the speed of the operative parts which lift the egg-holding receptacle from the water in the boiler, so that said receptacle will not be too rapidly moved and suddenly arrested when so lifted out of the water.

The invention consists in the matters hereinafter described and more particularly pointed out in the appended claims.

In the accompanying drawings, illustrating my invention—Figure 1 is a vertical sectional view of a timing device for egg boilers constructed in accordance with my invention; the egg-holding receptacle and the other parts being shown in one position; Fig. 2 is a vertical sectional view of the timing device, the egg-holding receptacle and the other parts being shown in a different position than that illustrated in Fig. 1; Fig. 3 is a top view of the timing device shown in Figs. 1 and 2, certain parts being omitted for the sake of clearness of illustration; Figs. 4 and 5 are fragmentary vertical sectional views taken on planes indicated by lines 4—4 and 5—5 of Fig. 10, respectively; both views being made on a smaller scale than that used in Fig. 10; Fig. 6 is a fragmentary view in side elevation of a portion of the casing provided with the vertical slot, showing a stop-member on said casing; Fig. 7 is a fragmentary, cross-sectional view taken on line 7—7 of Fig. 6; Fig. 8 is a vertical sectional view through the lower end of the casing and the auxiliary water tank; the other parts of the device being omitted; Fig. 9 is a cross-sectional view taken on a plane indicated by line 9—9 of Fig. 8; Fig. 10 is an enlarged, cross-sectional view, taken on a plane indicated by line 10—10 of Fig. 1; the auxiliary or timing weight carrying sleeve being shown in engagement with the spring-controlled guide member; Fig. 11 is an enlarged view in side elevation of certain details of construction to be hereinafter described; Figs. 12 and 13 are side and front views in elevation, respectively, of the escapement mechanism to be hereinafter described.

Referring to the drawings, illustrating one form of my invention, the same consists of a tube or tubular casing 20 placed in an upright position within, and at one side of an egg boiler or tank 21. The lower end of said casing 20 is seated on the bottom wall of said tank 21, and is closed by a bottom wall 22, so that water in said tank 21 surrounding the lower end of said casing, will not enter the same. Located at the top of said casing and mounted on a horizontally arranged shaft, the ends of which are journaled in the side walls of the casing, is a sheave or grooved pulley 23, over which is trained a flexible member 24, preferably having the form of a metallic tape. One end of said flexible member 24 extends outside of said casing 20, while the other end of the same is within said casing. Secured to the end of said flexible member 24 without said casing 20 is a rod 25 to the lower end of which is attached or secured a wire-mesh basket or foraminous receptacle 26 to be submerged in and raised out of the water in said tank 21. Said basket or receptacle 26 is adapted to contain the eggs or other articles to be cooked by the heated water in said tank 21. Rigidly secured to the outer surface of the casing 20, adjacent to the tank 21, is a guide bracket 27, through which said rod 25 passes. Adjacent the upper end of said rod 25 is secured a handle 28, adapted to be grasped for lowering the basket 26 into said tank 21. Secured to the end of said flexible member 24 within said casing 20 is a rod 29, to the lower end of which is attached a weight 30. Said weight 30 is somewhat less in weight than said basket or receptacle 26 and its contents. As shown in the drawings, said weight 30 is adapted to slide vertically within said casing 20, in the raising and lowering of said basket 26. The basket-carrying rod 25, the flexible member 24 and the weight-carrying rod 29, are of such length with respect to each other, that said weight 30 is adapted to move in said casing a distance equal to the distance said basket 26 is moved when lowered into and lifted from said tank 21. Mounted to slide endwise on said weight-carrying rod 29 is an elongated sleeve 31, to the lower end of which is attached a secondary weight 32 adapted to slide vertically in the casing above the weight 30. Said weight 32 is of such gravity that, when it rests upon and acts in connection with the counterbalance weight 30, above referred to, the gravity of the two weights will be sufficient to overcome the weight of the basket 26 and its contents. Said auxiliary weight 32 is provided with a centrally disposed vertical aperture registering with the bore of said sleeve 31 and through which said weight-carrying rod 29 passes. Said sleeve 31 is provided on one of its sides with downwardly directed fine rack-teeth 33 which, as shown in the drawings, extend substantially the full length of said sleeve 31. Said sleeve is substantially less in length than half the length of said rod 29. Projecting outwardly from one side of said auxiliary weight 32, and through a vertically arranged slot 34 in the wall of said tubular casing 20 is a handle 35, by means of which said auxiliary weight 32 and the sleeve 31 connected therewith may be raised (see Figs. 3 and 5).

Extending into the casing 20 through the side wall thereof, at a point above its center and to one side of the counterbalance weight-carrying rod 29, is a horizontally arranged shaft 36, upon the inner end of which, within said casing, is mounted and rigidly secured a rack-pinion 37, the teeth of which, on its side adjacent to the sleeve 31, are directed upwardly and correspond with, and are adapted to be engaged by, the teeth 33 on said sleeve 31, when the latter is raised by the handle 35 into position for engagement of its teeth 33 with the teeth of said rack-pinion 37. (See Figs. 4 and 5.) Mounted upon and rigidly secured to the outer end of said shaft 36, namely, that end outside of the casing 20, is a gear wheel 38, greater in diameter than the rack-pinion 37. Said gear wheel 38 is located within a box 39 secured to the side of the tubular casing 20, and which contains the operative parts of an escapement mechanism to be hereinafter described. Said shaft 36 is journaled in the wall 39ª of said box 39 adjacent and secured to the casing 20, in any suitable manner, but preferably by machine screws 39ᵇ, only one being shown in the drawings, (see Fig. 10). Surrounding said shaft 36 and extending between said box wall 39ª and the rack-pinion 37 is a spacing sleeve 40, which prevents said pinion 37 from moving endwise of said shaft 36. Located within said casing 20 below, but adjacent to said pinion 37 is a horizontally arranged guide member 41, provided at one end with a yoke 42, through which latter the counterbalance-weight-carrying rod 29 freely passes. The outer end 43 of said guide member 41 is straight and square in cross-section, and is adapted to slide in a guide aperture provided therefor in the side wall of said casing 20. Secured to and in alinement with said squared end 43 of said guide member, and located outside of said casing is a push rod 44 provided at its outer end with a head 45, between which and the wall of said casing 20 is located a spring 46, which acts on the push rod to throw the same outwardly. As shown in the drawings, said spring 46 is of coiled form and surrounds said push rod 44. Located within said casing 20 and extending from the inner wall thereof toward the yoke 42 of said guide-member 41, and in alinement with the squared end 43 of said guide-member, is a guide rod 47, the inner end of which extends into and has sliding engagement with a recess 48 provided in a lug 49 on the yoke 42 of said guide member 41, (see Figs. 10 and 11). Through the combination of the guide rod 47 and the squared end 43, said guide member 41 is supported in proper position within the casing 20 and permitted to have endwise movement therein. At the inner end of said squared part 43 of said guide member 41, and within said casing 20, said guide member is provided with a stop flange 50, adapted to contact with the inner surface of said casing, and limit the endwise movement of said guide member 41. When the stop flange 50 of said guide member 41 is in contact with the inner surface of said casing 20 (see Fig. 2), the counterbalance weight-carrying rod 29 passes freely through the yoke 42. Said yoke 42 is, however, in the path of movement of the auxiliary weight-carrying sleeve 31, and is moved endwise against the tension of said spring 46 to accommodate said sleeve 31 when the said sleeve is raised and enters within said yoke 42. When said sleeve 31 is within said yoke 42, the tension of said spring 46 acts to hold said sleeve 31 in contact with the pinion 37, so that the teeth of the sleeve will be held in engagement with the teeth of the pinion. By reason of the fact that the rack teeth 33 on said sleeve 31 are directed downwardly and the adjacent teeth of said pinion 37 are directed upwardly, said rack teeth 33 on the sleeve 31 will pass by the teeth of the pinion 37 in the upward movement of the former without effecting the rotation of said pinion. In the downward movement of said sleeve 31, the rack teeth 33 thereof, engaging the teeth of said pinion 37, will effect the rotation of said pinion. The upper end of said sleeve 31 is beveled or rounded so that the same will readily enter within said yoke 42 in the upward movement of said sleeve.

The escapement mechanism referred to, as shown in the drawings, is constructed as follows: Mounted on and rigidly secured to a horizontally arranged shaft 51 extending between and journaled in laterally spaced brackets 52, 53, which are located within and secured to the wall 39ª of the box 39, is a pinion 54, with which meshes the gear wheel 38, hereinbefore referred to. Mounted on the end of said shaft 51 is an escapement wheel 54, provided with laterally extending teeth 55, adapted to be engaged in the familiar manner by longitudinally spaced pallets 56, 56 on a vertically arranged shaft 57 which is journaled in the top and bottom walls of the box 39. Said shaft 57 extends through the top wall of said box 39 and carries at its upper end a pair of horizontally arranged, oppositely extending arms 58, 59, upon the outer ends of which are secured weights 60, 61. Said vertical shaft 57 is rocked by the action of pallets 56, 56, one of which is located above and the other below the shaft 51; the weights 60, 61 acting to retard the oscillatory movement of the shaft 57, as common in such escapement devices.

Located within said tank 21 and placed in an upright position beside and in contact with said casing 20 is an auxiliary tank 62 adapted to contain water. (See Figs. 8 and 9.) Said casing 20 and said auxiliary tank 62 are in communication with each other through an aperture 63 opening through the contiguous walls of said casing and tank, at their lower ends (see Figs. 8 and 9). The water in said tank 62 flows into the lower end of said casing 20 as the counterbalance weight 30 is raised. When the weight 30 moves downward, or toward the lower end of said casing 20, the water standing in the lower end of said casing is forced through said aperture or passage 63 into said tank 62, and acts to retard or check the speed of said weight in its descent.

For convenience in setting the auxiliary or timing weight 32, so that the sleeve 31 may extend a distance above the pinion 37 to retain the basket or receptacle 26 in the water in the tank 21 a desired length of time, I have provided a vertically adjustable stop-member 64 upon the casing 20. Such stop-member, as shown in the drawings, comprises a clamp screw 64ª having a screw-threaded stem which extends through the vertical slot 34 in the casing 20 and outer and inner clamp plates 65 and 66 adapted to be clamped against the outer and inner surfaces of said casing by the action of said clamp screw 64ª turns freely in the outer path of movement of said auxiliary or timing weight 32 when the same is lifted. Said clamp screw 64ª turns freely in the outer plate 65 and its stem has screw-threaded engagement with the inner plate 66. Said outer plate 65 is provided with a finger or pointer 65ª adapted to be moved vertically over the graduations or marks of a scale on the outer surface of said casing adjacent said slot 34 (see Figs. 6 and 7). By moving said stop member 64 vertically in said slot 34 the finger 65ª may be set at the mark or graduation of a scale determining the length of time the egg-holding receptacle or basket 26 is to remain in the water in the tank 21.

The device hereinbefore described and shown in the drawings, operates as follows: When the several parts of the device occupy the positions shown in Fig. 2, the basket or receptacle 26 is raised out of the water in the boiler or tank 21; the rack teeth 33 being then out of engagement with the pinion 37 and the auxiliary weight 32 resting on the counterbalance weight 30. The gravity of the combined weights maintains the basket 26 in its raised position both before and after the eggs or other articles to be cooked or boiler are placed in said basket or receptacle 26. The stop member 64 having been previously set with its pointer 65ª at the mark or graduation on the scale determining the length of time the eggs are to remain in the boiling water, the auxiliary weight 32 is raised from contact with the counterbalance weight 30 by the handle 35 until stopped by contact with the said stop-member 64. As the weight 32 is lifted the upper end of the sleeve 31, to which said weight is connected, passes through said guide member 41 and stands above the pinion 37 with the teeth of the latter engaged by the rack-teeth 33 on said sleeve 31. The auxiliary weight 32 will then be supported by the engagement of the teeth on the sleeve 31 with those of the pinion, at a point above the position occupied by the main weight 30, when the latter is lifted to the extreme limit of its upward movement and the basket 26 depressed to the bottom of the tank. Following the lifting and setting of the auxiliary weight 32, the basket 26 is then lowered into the boiling water in the boiler or tank 21, by the application of sufficient force for this purpose to the handle 28 at the upper end of the basket carrying rod 25. The depression of the basket 26 acts to pull downwardly on the outer end of the flexible member or metal tape 24, running over the pulley 23, and to raise the rod 29 and counterbalance weight 30 attached thereto. As the counterbalance weight 30 is raised the water in the auxiliary tank 62 flows into the lower end of the casing 20 through the port 63 and occupies the space vacated by the ascending weight 30. When the basket 26 is fully depressed, the counterbalance weight 30 stands at a distance below the auxiliary weight 32 which will be greater or less according to the vertical position occupied by said auxiliary weight when lifted, or upon the distance to which the upper end of the sleeve 31 has been carried above the pinion 37 in lifting the auxiliary weight for setting the same. When the main and auxiliary weights are both in their raised positions, as shown in Fig. 1 of the drawings, the level of the water in the lower end of the casing 20 will be below the bottom of said main weight 30. Said main weight 30, being somewhat lighter in weight than the basket 26, has no lifting effect upon said basket, and consequently both basket and weight remain in the positions shown in Fig. 1, during the descent of the auxiliary weight into contact with the main weight. As soon as the auxiliary weight is released, after being lifted to the desired extent, or to the point indicated by the adjustable stop, as described, said auxiliary weight 32 begins to descend and the rack teeth 33, engaged with the pinion 37, operate to rotate the same in the downward movement of the sleeve 31. The speed of rotation of the pinion 37 being controlled by the escapement mechanism, the auxiliary weight will descend slowly and will occupy a period of time in its descent, before coming into contact with the main weight 30, depending on the length of the upper part of the sleeve that was carried above the pinion in setting the auxiliary weight for acting. The main weight 30 will usually be lifted and the basket lowered, after the auxiliary weight has been lifted or set for action, but such lifting of the main weight will be accomplished immediately after the lifting of the auxiliary weight and before the same has descended any considerable distance, owing to the slow downward movement of the auxiliary weight. The sleeve 31 and its attached weight will continue their downward movement, occupying such length of time in so doing as determined upon for the cooking of the eggs, until the rack teeth 33 on said sleeve become disengaged from the pinion 37, when the auxiliary weight will drop into contact with and rest upon the main weight 30. The sleeve 31 and the weight 32 carried thereby, at this time will be in the position shown in Fig. 1; the auxiliary weight 32 resting upon the counterbalance weight 30, and both weights being in movement toward the bottom of said casing 20. The gravity of the two weights 30 and 32 is sufficient to overcome the weight of the basket 26 and its contents, so as to raise the basket out of the water in the boiler or tank 21. As the weights 30 and 32 move toward the bottom of the casing 20, the weight 30 comes into contact with and displaces the water in the lower end of said casing, the water being forced therefrom into the auxiliary tank 62 through the aperture or port 63. As soon as the counterbalance weight 30 enters the water, its downward movement is retarded or checked by the resistance afforded by the size of the port 64 to the outflow of water from the lower end of the casing, and the basket 26 is drawn slowly or gradually out of the water in the tank 21. Any sudden upward movement of said basket 26, such as might act to throw the eggs out of the same, is thereby prevented. As a further improvement, I attach to the bottom of the counterbalance weight 30 a float 30$^a$, which may be made of cork or the like. A float thus applied renders the weight somewhat buoyant, and this further retards the movement of said weights 30 and 32, after the former enters the water in the lower end of said casing 20.

The provision of the port in the lower end of the casing, with means for furnishing a supply of water to said casing, constitutes in effect a controlling means for retarding the speed of the counterbalancing weights in the latter part of their descent, and as a speed retarding device, adapted for the same purpose, may be made in a number of different forms, the same is herein claimed, without restriction to the specific form of the same described and shown.

In setting the auxiliary or timing weight 32, it may happen that the sleeve 31 extends above the pinion 37 such a distance that the time required for the descent of the timing weight 32 before the rack teeth 33 on said sleeve become disengaged from said pinion 37, will be longer than the basket 26 is to remain in the boiling water in the tank 21. To re-set the timing weight 32, so that said sleeve 31 extends above the pinion 37 the proper distance, pressure is applied to the push rod 44 and the yoke 42 of the guide member 41 moved out of contact with said sleeve, thus releasing the rack teeth 33 from engagement with the pinion 37 and the sleeve 31 may be moved downward the desired distance required to re-set the timing weight. After the timing weight 32 has been re-set, the push rod 44 is released and said sleeve 31 is forced into engagement with said pinion 37, as is apparent.

Inasmuch as a device embracing the general features of construction hereinbefore set forth may be variously modified in practice with respect to the form and arrangement of its parts, I do not desire to be limited to the specific features of construction illustrated in the accompanying drawings, except so far as the same may be pointed out in the appended claims as constituting parts of my invention.

I claim as my invention:

1. In a device of the character described, in combination with an upright frame member, a vertically movable receptacle, a vertically movable main counterbalance weight connected with said receptacle, a vertically movable timing weight adapted for operative connection with said main counterbalance weight and the combined weight of both of said weights, when connected, effecting the lifting of said receptacle, and means adapted for maintaining said timing weight out of operative connection with said main counterbalancing weight for a predetermined period of time, while permitting said timing weight to descend gradually into operative connection with said counterbalance weight.

2. In a device of the character described, in combination with an upright frame member, a vertically movable receptacle, a vertically movable main counterbalance weight connected with said receptacle, a vertically movable timing weight adapted in its downward movement to come into engagement with said main counterbalancing weight; and the combined weight of both of said weights when in engagement effecting the lifting of said receptacle, and means for sustaining said timing weight out of engagement with said counterbalance weight and permitting said timing weight to descend gradually into engagement with said counterbalance weight embracing an escapement mechanism.

3. In a device of the character described, in combination with an upright frame member, a vertically movable receptacle, a vertically movable main counterbalance weight connected with said receptacle, a vertically movable timing weight adapted for operative connection with said main counterbalance weight and the combined weight of both of said weights when connected effecting the lifting of said receptacle, said timing weight being provided with an upright member movable therewith, and means adapted to engage said upright member at any point of its length for sustaining said timing weight out of operative connection with said main counterbalance weight for a predetermined period of time, while permitting said timing weight to descend gradually into operative connection with said counterbalance weight.

4. In a device of the character described, in combination with an upright frame member, a vertically movable receptacle, a vertically movable main counterbalance weight connected with said receptacle, a timing weight adapted for operative connection with said main counterbalance weight and the combined weight of both of said weights when connected effecting the lifting of said receptacle, said timing weight being provided with an upright member, and means for maintaining said timing weight out of operative connection with said counterbalance weight, while permitting said timing weight to descend gradually into operative connection with said counterbalance weight, embracing a rotative member adapted to engage said upright member, and an escape mechanism controlling the speed of rotation of said rotative member.

5. In a device of the character described, in combination with an upright frame member, a vertically movable receptacle, a main counterbalance weight connected with said receptacle, a timing weight adapted for operative connection with said main counterbalance weight and the combined weight of both of said weights when connected effecting the lifting of said receptacle, said timing weight being provided with an upright member, means adapted to maintain said timing weight out of operative connection with said counterbalance weight while permitting said timing weight to descend gradually into operative connection with said counterbalance weight, embracing a rotative member adapted to engage said upright member and means for controlling the speed of rotation of said rotative member, and means for yieldingly holding said upright member in engagement with said rotative member.

6. In a device of the character described, in combination with an upright frame member, a vertically movable receptacle, a main counterbalance weight connected with said receptacle, a timing weight adapted for operative connection with said main counterbalance weight and the combined weight of both of said weights when connected effecting the lifting of said receptacle, an upright rack bar secured to the timing weight, a rotative pinion adapted to engage said rack bar, means controlling the speed of rotation of said pinion, and means for yieldingly holding said rack bar in engagement with said pinion, the teeth of said pinion and rack bar being adapted for the free upward movement of the rack bar relatively to the pinion, said receptacle having no movement during the time that said rack bar and pinion are in engagement.

7. In a device of the character described, in combination with an upright frame member, a vertically movable receptacle, a main counterbalance weight, an upright stem attached to said weight, means providing connection of said receptacle with said stem, embracing a pulley and a flexible connecting member, a timing weight adapted in the movement thereof to act in connection with said main counterbalance weight and the combined weight of both of said weights when acting together effecting the lifting of said receptacle, said timing weight being provided with an upright sleeve surrounding said stem and provided with rack teeth, a pinion adapted to engage said rack teeth, and means embracing an escape mechanism acting to control the rotative movement of said pinion.

8. In a device of the character described, in combination with an upright tubular casing, a vertically movable receptacle, a main counterbalance weight located in said casing, means providing connection of said receptacle with said counterbalance weight, a vertically movable timing weight located in said casing above the said main counterbalance weight, and means for maintaining said timing weight out of engagement with said main counterbalance weight, while permitting said timing weight to descend gradually into contact with said counterbalance weight; the combined weight of both of said weights, when in engagement, effecting the lifting of said receptacle.

9. A device of the character described, comprising an upright tubular casing, a vertically movable receptacle, a main counterbalance weight located and adapted to move vertically in said casing, an upright stem connected with said counterbalance weight, means connecting said stem with said receptacle, a vertically movable timing weight located in said casing, said timing weight adapted in the downward movement thereof to become operatively connected with said counterbalance weight and the combined weight of both of said weights when connected effecting the lifting of said receptacle, a sleeve connected with said timing weight surrounding said stem, said sleeve being provided with rack teeth, a pinion located in said casing and adapted to engage said rack teeth, and means embracing an escape mechanism for controlling the speed of rotation of said pinion.

10. A device of the character described, comprising an upright tubular casing, a vertically movable receptacle, a vertically movable main counterbalance weight located in said casing, said main counterbalance weight being provided with an upright stem, a pulley mounted in the casing, a flexible member connecting said receptacle with said stem, a vertically movable timing weight located in said casing above the main counterbalance weight and adapted in the downward movement thereof to engage said counterbalance weight, and the combined weight of both of said weights when in engagement effecting the lifting of said receptacle, a sleeve surrounding said stem and connected with said timing weight, said sleeve being provided with rack teeth, a pinion located in said casing and adapted to engage the rack teeth of said sleeve, means for controlling the speed of rotation of said pinion, and yieldable means engaging said sleeve to hold the rack teeth thereof in engagement with said pinion.

11. A device of the character described, comprising an upright tubular casing, a vertically movable receptacle, a main counterbalance weight located and adapted to move vertically in said casing, means connecting said counterbalance weight with said receptacle, a vertically movable timing weight located in said casing above the main counterbalance weight and adapted in the downward movement thereof to become engaged with said counterbalance weight, and the combined weight of both of said weights when in engagement effecting the lifting of said receptacle, an upright member connected with said timing weight and provided with rack teeth, a pinion located in said casing and adapted for engagement with the said rack teeth, means including an escapement mechanism for controlling the speed of rotation of said pinion, a yoke mounted transversely in the casing and adapted to engage the said upright member to hold the rack teeth thereof in engagement with said pinion, and a spring applied to actuate said yoke.

12. A device of the character described, comprising an upright tubular casing, a vertically movable receptacle, a main counterbalance weight located and adapted to move vertically in said casing, means connecting said counterbalance weight with said receptacle, a vertically movable timing weight located in said casing above the main counterbalance weight and adapted in the downward movement thereof to become engaged with said counterbalance weight and the combined weight of both of said weights when engaged effecting the lifting of said receptacle, an upright member connected with said timing weight and provided with rack teeth, a pinion located in said casing and adapted for engagement with the said rack teeth, means including an escape mechanism for controlling the speed of rotation of said pinion, a yoke mounted transversely in the casing and adapted to engage the said upright member to hold the rack teeth thereof in engagement with said pinion, a spring applied to actuate said yoke, and finger piece on said yoke for the manual operation of the same.

13. A device of the character described, comprising an upright tubular casing, a vertically movable receptacle, a main counterbalance weight located and adapted to move vertically in said casing, an upright stem connected with said counterbalance weight, means connecting said stem with said receptacle, a vertically movable timing weight located in said casing above the main counterbalance weight and adapted to move downward in said casing and engage said counterbalance weight, the combined weight of both of said weights when engaged effecting the lifting of said receptacle, a sleeve connected with said timing weight and surrounding said stem, said sleeve being provided with rack teeth, a pinion located in said casing and adapted for engagement with the said rack teeth, means including an escape mechanism for controlling the speed of rotation of said pinion, said tubular casing being provided with a vertically extending slot, and an operating handle connected with said timing weight and extending outwardly through said slot.

14. A device of the character described, comprising an upright tubular casing, a vertically movable receptacle, a vertically movable main counterbalance weight located in said casing, a timing weight located in said casing above the main counterbalance weight and adapted in the downward movement thereof to become operatively engaged with said counterbalance weight, the combined weight of both of said weights when engaged effecting the lifting of the said receptacle, means for controlling the downward movement of said timing weight, embracing an escape mechanism, a scale on the said casing, and a vertically adjustable stop member associated with said scale for limiting the upward movement of the timing weight in setting the same for operation.

15. In a device of the character described, in combination with an upright frame member, a vertically movable receptacle, a main counterbalance weight connected with said receptacle, a timing weight adapted for operative connection with said counterbalance weight and the combined weight of both of said weights when connected effecting the lifting of said receptacle, means for maintaining said timing weight out of operative connection with said main counterbalance weight for a predetermined period of time, and means for checking the downward movement of both of said main and timing weights.

16. In a device of the character described, in combination with an upright frame member, a vertically movable receptacle, a main counterbalance weight connected with said receptacle, a timing weight adapted to engage said main counterbalance weight and combined weight of both of said weights when engaged effecting the lifting of said receptacle, means for maintaining said timing weight out of engagement with said main counterbalance weight during a predetermined length of time, and means for retarding the movement of both of said main counterbalance and timing weights after the same are in engagement.

17. In a device of the character described, in combination with an upright tubular casing, a vertically movable receptacle, a main counterbalance weight located in said casing, means providing connection of said main counterbalance weight with said receptacle, a vertically movable timing weight located in said casing and above the said main counterbalance weight, said timing weight adapted in the downward movement thereof to become engaged with said counterbalance weight and the combined weight of both of said weights when engaged effecting the lifting of said receptacle, means for maintaining said timing weight out of operative connection with said counterbalance weight for a predetermined period of time, and an auxiliary fluid containing casing, having communication with the space in said tubular casing below said counterbalance weight.

18. In a device of the character described, in combination with an upright frame member, a vertically movable receptacle, a main counterbalance weight connected with said receptacle, a timing weight adapted for operative connection with said main counterbalance weight and the combined weight of both of said weights, when connected, effecting the lifting of said receptacle, means for checking the downward movement of both of said weights when connected comprising two liquid receptacles into one of which the said main weight descends and forces the liquid below the same into the other of said receptacles; said receptacles having communication with each other at one point only, and a float attached to the bottom of said main weight.

In testimony that I claim the foregoing as my invention I affix my signature in the presence of two witnesses, this 2nd day of April A. D. 1913.

CHARLES CALVERT LAMB.

Witnesses:
    EUGENE C. WANN,
    M. F. ANTHONY.